March 24, 1970     J. BJORKSTEN     3,502,113
TUBULAR ARTICLE AND METHOD OF MANUFACTURE
Filed Dec. 14, 1966     8 Sheets-Sheet 1

FIG.1

March 24, 1970 J. BJORKSTEN 3,502,113
TUBULAR ARTICLE AND METHOD OF MANUFACTURE
Filed Dec. 14, 1966 8 Sheets-Sheet 4

March 24, 1970   J. BJORKSTEN   3,502,113
TUBULAR ARTICLE AND METHOD OF MANUFACTURE
Filed Dec. 14, 1966   8 Sheets-Sheet 6

March 24, 1970 J. BJORKSTEN 3,502,113
TUBULAR ARTICLE AND METHOD OF MANUFACTURE
Filed Dec. 14, 1966 8 Sheets-Sheet 8

United States Patent Office 3,502,113
Patented Mar. 24, 1970

3,502,113
TUBULAR ARTICLE AND METHOD
OF MANUFACTURE
Johan Bjorksten, Fitchburg, Wis.
(P.O. Box 265, Madison, Wis. 53701)
Filed Dec. 14, 1966, Ser. No. 607,591
Int. Cl. F16l *11/02*
U.S. Cl. 138—129
5 Claims

ABSTRACT OF THE DISCLOSURE

Reinforced plastic tubes are produced by spiral winding plastic film which is reinforced with a prearranged geometrical pattern of non-woven fibers, so arranged that in the final wound article the angular directions of the reinforcements are optimized in regard to the properties desired from the tube produced from them. Preferably the angle of at least one major group of fibers in the film or film laminate spiral wound to form the tube should bear such relationship to the angle of spiral winding in the process, that the tubes thus produced will have substantial reinforcement by fibers positioned in planes transversal to the longitudinal axis of the tube. Resultant tubes will preferably comprise multiple layers of plastic film bonded together with adhesive which permits some slippage of fibers in response to stresses, and in this adhesive parallel fibers which substantially form circles in planes perpendicular to the axis of resultant tubular articles.

---

This invention relates to film wound cylindrical structures, and more specifically to ducting and tubing which is spiral wound from a sheet material and joined together in a helical fashion by heat sealing, adhesive sealing, bonding or otherwise.

Heretofore, such tubes have been made from ordinary flexible sheet materials, or from flat flexible materials having reinforcements of woven fibers, or of strands or other fiber bundles substantially parallel to the side of the material being helically wound.

The present invention contemplates such helically wound tubular structures which are made of sheet material susceptible to tear, such as paper, metal foil, plastic films, and the like, and which are reinforced by fibers forming an angle with the longitudinal direction of the helically wound sheet material. The angle of the reinforcement against this longitudinal axis preferably has such a relationship to the angle of the helical winding that the said reinforcement fibers will form radial or hoop reinforcement for the said tubes.

Another aspect is a novel type of light weight tubular material.

Another object is a method for making tubular material by film winding.

Another object is multiple ply, adhesively wound, reinforced tubular material.

Further objects will become apparent as the following detailed description proceeds.

In accordance with my invention, I prepared cylinders, or continuous tubes, by spiral winding film to which were applied, bonded, or otherwise attached non-woven fiber reinforcement, in which the strands were preoriented in one or more main directions, the fibers within said respective directions being parallel with each other and the angles chosen so that the maximum desired properties were obtained in the winding process by orientation of these prearranged reinforcing fibers in the directions optimal for each intended application.

EXAMPLE 1

Figure 1:
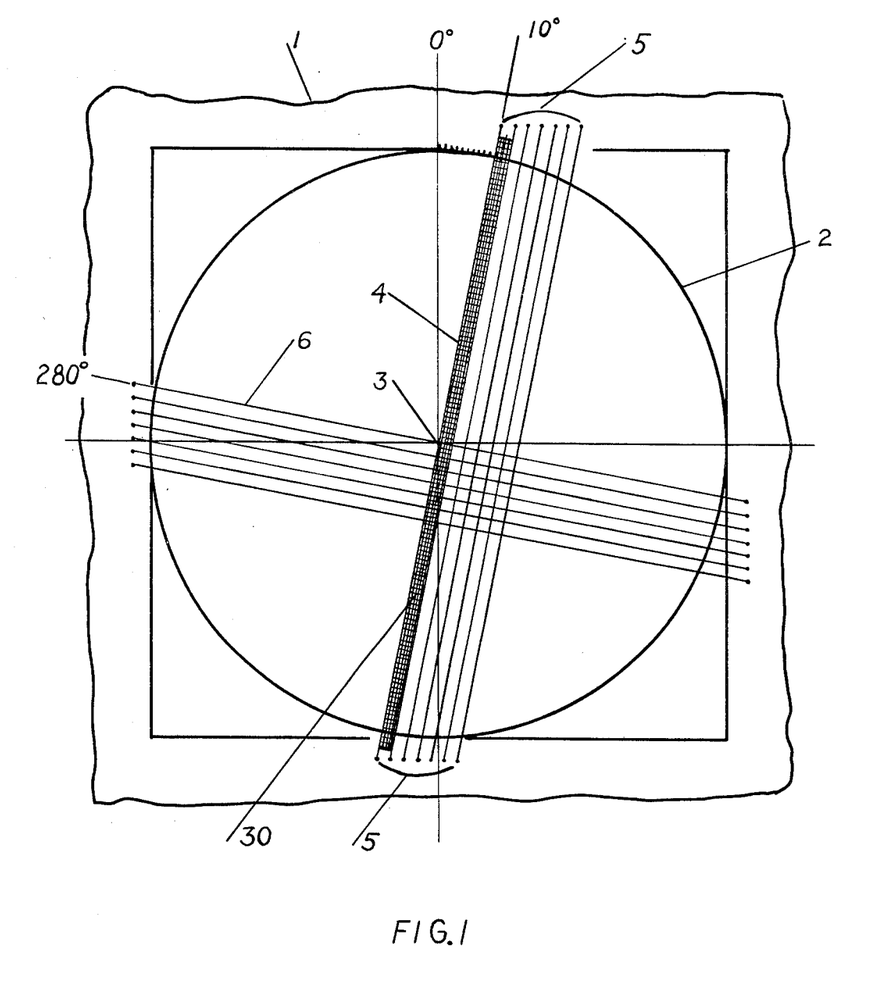
FIGURE 1 is a sectional view from above, FIGURE 2 a side view, FIGURES 3, 4 and 5 perspective views.

Referring to FIGURE 1, on a smooth wooden floor a circle 2 was drawn, using a black carpenter's pencil. The diameter of this circle was 100 inches. The center 3 of the circle was clearly marked with a pencil and the periphery of the circle was divided in 360 equal subdivisions or degrees, which were marked on the periphery of the circle, zero being directly above the center point from the operator's viewpoint. Onto the floor covering this drawn circle was attached a sheet of transparent plastic 1, for example, by means of adhesive tape. If for any reason extreme precision were desired, it would be possible to use a more sophisticated fastening means such as vacuum suction through a multiplicity of holes in the floor or the like. In the present case, however, I used unsophisticated means, and believe the invention will be most readily understood if these are first described.

In the present example I used transparent .003″ film of preoriented high density polyethylene through which the circle and its markings could be readily seen. If I had chosen to employ non-transparent film, I could have substituted a projection slide for the circle drawn on the floor and projected the image of the circle onto the non-transparent film from a projector in the roof. Thus the identical result would have been obtained.

I then stretched a 40 denier nylon fiber 4 and nailed it to the floor just beyond the periphery of the circle with nails 5 so that it passed through the center of the circle and through the markings 10° and 280° on the periphery thereof, forming thus a 10° angle with the radius going through the center and the 0° point on the periphery. The tension was sufficient to keep the fiber straight. I then laid a square wooden rod 30 ¼″ to the side along the taut fiber between points 10 and 280 so that one side of this wooden rod or ruler coincided with the first nylon fiber. I then placed a similar nylon fiber with the same tension along the other side of the wooden ruler, thus obtaining a second nylon fiber parallel with the first and spaced ¼″ away from it. I then moved the ruler to the other side of this second fiber and laid still another fiber to coincide with its other side and moved again the ruler, repeating this procedure toward both sides until I had laid and nailed down to the floor a multiplicity of fibers 4 parallel with each other and forming an angle of 10 degrees with the radius going through the zero point of the circle and covering the surface of the circle. These fibers were attached to the floor by nails 5.

I then drew a nylon fiber 6 through the center point of the circle and the 100 and 280 points on the periphery of the circle so that it formed a 90° angle with all of the fibers previously laid, moved my wooden ruler 30 so that one side of the ruler coincided with this new string, laid another string parallel to it ¼″ away along the ruler, nailed these down to the floor and again repeated the procedure of moving the ruler for each fiber laid, laying another parallel with it at a quarter of an inch distance until a square the side of which equaled the diameter of the circle and in which the circle was thus inscribed and encompassed had been laid out, covered with the two systems of fiber having 90° angles between all fibers of the two systems.

I then applied to the fiber-covered plastic sheet thus prepared an adhesive so as to cause the fibers to adhere to the plastic sheet in such a fashion that they could be handled after detaching it from the floor. This was accomplished by spraying onto the fabric a solution of 10% neoprene in a toluene-cyclo-hexene mixture, proportions one to one, and allowing the solvent to evaporate overnight with good ventilation, leaving a tacky surface into which the fibers were pressed with a six inch wide polytetrafluoroethylene covered roller weighing one and a half pounds and having a diameter of 4 inches. Using a polytetrafluoroethylene covered ruler to guide a knife, I then slit the resultant sheet into 6″ wide strips, cutting in a direction paralleling a line going through the center of the circle and the points 0 and 180 on its periphery. Thus the reinforcement fibers in these resultant strips formed angles of 10° and 280° respectively with the longitudinal axis of said strips, and 90° with each other.

Figure 2:
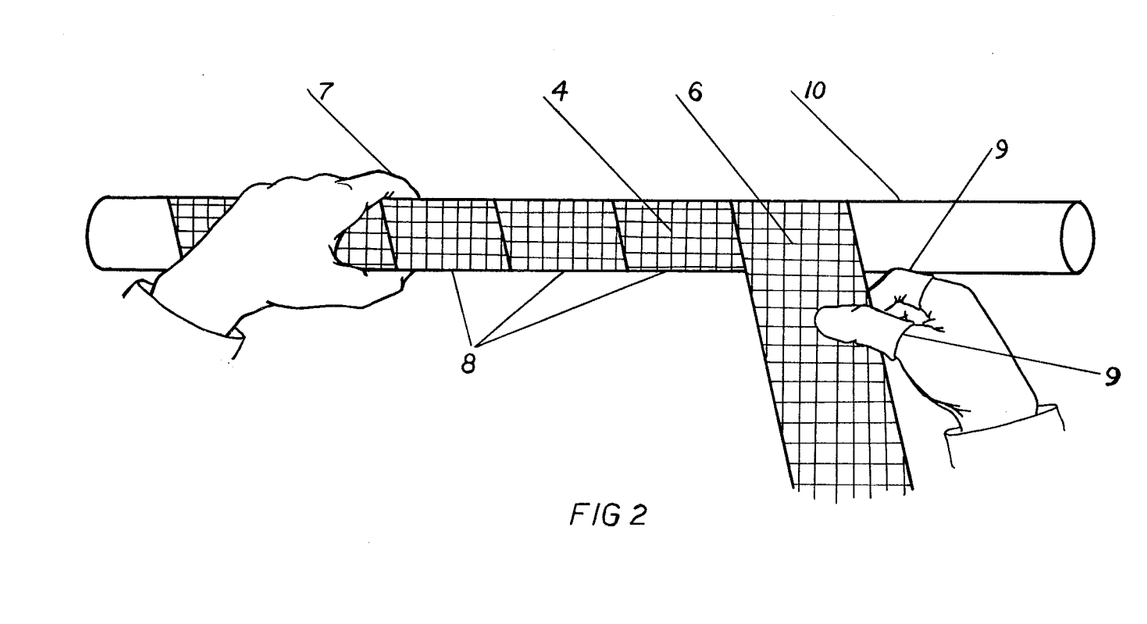
Figure 6:
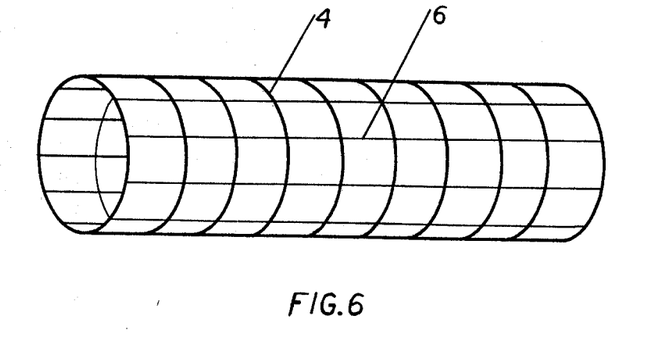
FIGURES 6 and 7 are perspective views of tubing made in accordance with the invention and FIGURE 8 is a perspective view illustrating the take-off mechanism of a production device.

I then took a round balsa wood rod 10, FIG. 2, 2 feet long and 2″ in diameter and, twisting it between my fingers 7, fed onto it the strips 8 thus prepared with the adhesive side up. To facilitate handling, I had covered my fingers with 4″ "Teflon" film finger covers stapled together at the ends and .0005″ thick 9. I fed the plastic film-fiber strips to the rod at such an angle so that one of the fiber systems 4 was perpendicular to the rod and the other fiber system 6 was parallel with the rod. This was an angle of 80° between the longitudinal axis of the film and that of the wooden rod. Using this as a guideline, it was not difficult thus proceeding manually to keep the feeding angle of the strip quite accurately at 80° with the axis of the wooden rod. I maintained sufficient tension to avoid air bubbles forming between the plies of the rod and with a little exercise it was possible to produce multiply film wound pipe in which the reinforcements formed hoops in the plane perpendicular to the axis of the pipe, thus making for maximum burst strength, with the other set of fibers parallel with the length direction, thus making for maximum rupture strength. The pipe thus wound is shown in FIGURE 6.

EXAMPLE 2

I proceeded as described in detail in Example 1 excepting that the film was .004″ polyvinylchloride rigid calendered, the fiber was polyethyleneglycol-terephthalate, the adhesive was 5% of polyvinylchloride, molecular weight 200,000, dissolved in the mixture of 80% methyl ethyl ketone, 2% of methylformamide and 15% of nitromethane, 1% of isopropanol and 2% of tetrahydrofurane.

EXAMPLE 3

Figure 3:
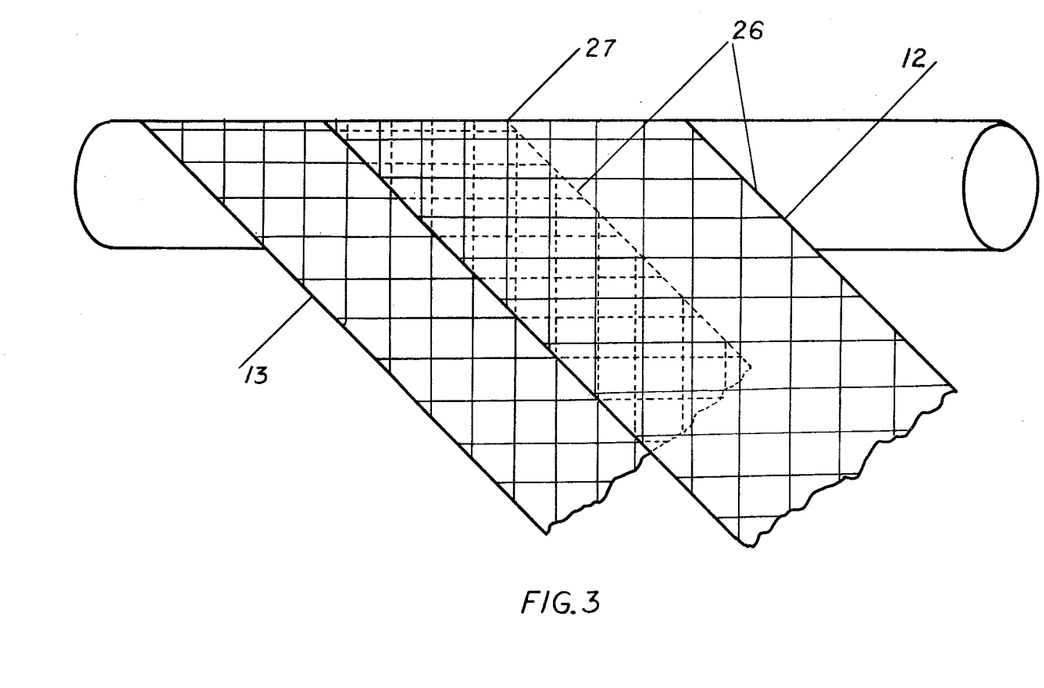

The method used was similar to that in Example 1, except that the fiber systems were laid up at the angles 45° and 315° and the strip was fed in at an angle of 45° against the axis of the wooden rod, in order to achieve the reinforcements with one system perpendicular to the axis of the pipe and the other parallel therewith. The relationship between strip width and mandrel radius is expressed by the equation $$\pi r = \frac{t}{\sqrt{v2}}$$

where $r$ is the radius of the mandrel and $t$ the width of the strip. Under this condition, the reinforced plies 12 and 13, FIG. 3, were applied side to side with no overlap and it therefore became necessary to feed in two strips at the same time so that the center line of one strip 27 came over the edges of the others 26, thus obtaining a continuous structure of staggered layers as shown in FIGURE 3. Many plies could be placed in this fashion successfully, the number being limited only by the number of operators who could crowd around the two foot round wooden stick as this was being twirled. After the desired number of plies had been applied of the reinforced material, a final ply of adhesive free plastic film was finally applied in order to cover the adhesive of the top ply.

EXAMPLE 4

Using the arrangement shown in FIG. 1, I lined up the fibers on a plasticized transparent polyvinylchloride film, the plasticizer being 20% dioctylphthalate, and applied three fiber systems: one system parallel with the fiber and through the center and the 25° point on the periphery of the circle; one through the center and the 295° point; and one through the center and the 100° point. The adhesive used was a water emulsion of rubber latex to which had been added 10% of methyl ethyl ketone and 1% of dictylphthalate, whereupon the whole had been re-passed through a colloid mill to stabilize the dispersion. This was applied to the film, allowed to dry overnight, whereupon another similar film was rolled onto the first film and fibers thus prepared so as to obtain a laminate. This then was stripped, and having the system laminated, it was not necessary to employ the finger protectors of polyethyleneglycol terephthalate but the strips could be handled quite conveniently. As the strips were being wound, they were heat welded together, by means of a conventional hair dryer, the air supply to which had been restricted by a membrane perforated with a few small holes, so that the outgoing air stream had a temperature of about 350° F. Under this condition, it was possible to heat seal the films together as the tube was being wound. To further secure the film, some of the polyvinyl chloride solution in methyl ethyl ketone was applied to the joints as a further precaution. It dried rapidly hard to the touch, thus resulting in an integral tube formation where protection was secured by fiber layers in three different directions. The angle of feeding was adjusted so that one of these three fiber layers was coming in radial to the axis of the resultant tube and mandrel on which this tube was being made by helical winding. By radial, I mean the reinforced sheet was applied so that the fibers in one of these three directions would form hoops around the tube, it being relatively immaterial for the purpose of the invention which one of the fiber systems was chosen to perform this function. The angles of the others were adjusted for resistance to sharp stresses or such other demands as might be convenient in each particular case.

While, generally speaking, the maximum stress in ducts or tubing is a hoop stress or else a tensile stress, it may sometimes be desired, particularly when solid matter is to be handled in the tube, and shocks can be expected from random directions, particularly at bends, to have multiple fiber systems, of which some may be at random angles with the main directions.

Figure 7:
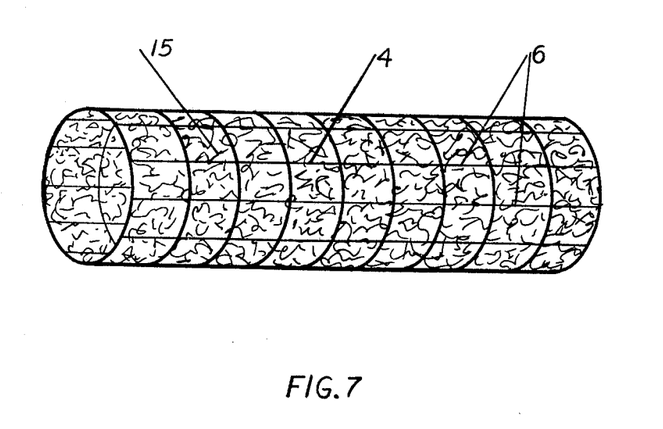

Such a tube is shown in FIG. 7 in which randomly arranged fibers 15 are contained in the film as this is being wound. These fibers 15 may be mixed into the plastic from which the film is extruded, or they may be randomly spread into the space between the two films from which the strip is laminated before being helically wound by blowing, dusting, sedimentation or in any other manner, or it may be applied to a base as film forming plastic is extruded or coated onto it. The point is that the resultant film, which is then used to prepare the tube by helical winding, is made to contain randomly applied fibers in addition to the geometrically aligned fibers 4 and 6 as already discussed, or their equivalents.

The concept of making fiber strips in which the fibers are geometrically arranged in parallel systems, and then winding so that one of these parallel systems is perpendicular to the axis of the resultant tube, and preferably another system is parallel with the said axis, has been elucidated in the above examples. Desired results can be obtained if the fiber wound contains at least one system of parallel fibers and the fiber systems in the other directions, if any, either are randomly applied, such as fibers randomly suspended in the film material or applied randomly thereto. In these cases the maximum hoop strength would be obtained together with an enhanced resistance to random shock. Such a structure would be illustrated in FIG. 5, if the fibers 6 were omitted.

The principle of film winding to attain tubular structures, using films in which prearranged geometrically selected fibers or narrow film strip reinforcements are applied, is obviously capable of wide variation. It is believed that this has been sufficiently illustrated in the examples here given, without need for elaborating with additional geometrical systems, fiber angles, the kind of fiber film, or adhesive, or modes of layup. I shall, therefore, now present some examples to illustrate the application of large scale manufacturing methods for the broader application and low cost production of the film wound reinforced systems embodied in this invention.

EXAMPLE 6

Figure 4:
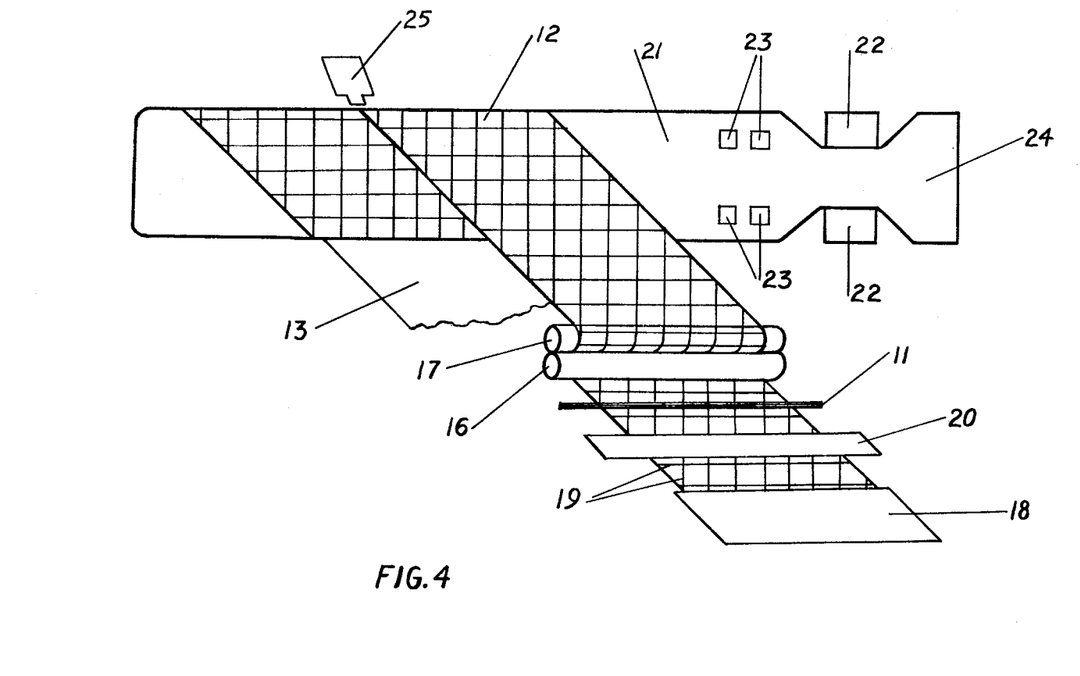

Large scale production of the tubing was carried out as follows: Fibers were crisscrossed on a machine such as any one of the several machines now commercially available for this purpose so that the said fibers emerged in a 45° diamond pattern, 45° being the angle between each of the two sets of parallel fibers with the longitudinal axis of the machine direction. Referring to FIGURE 4, the fibers were secured to the film by means of adhesive from an adhesive applicator 11 which could be a sprayer, an air knife, a doctor bar, a wick system, a printing roller, a hot melt applicator, softening of a film by application of solvent as liquid or vapor, or any other such device serving as means for securing the fibers to the film and preferably at the same time serving the purpose of aiding the lamination of the film, although a separate laminating adhesive could be applied subsequently. This, however, is regarded as an unnecessary complication and we prefer, therefore, to proceed with a residual adhesivity left on the film and fiber, including but not limited to contact, heat, or pressure adhesivity. The film is passed through the nip between two rollers 16 and 17 of which the one on the adhesive side 16 is coated with polyethylene tetrafluoride or alternatively with a coating of a repellant for whatever adhesive is used, such as, for example, a water or gum suspension for a hydrophobic adhesive, an oil for a hydrophilic adhesive, etc. It can also be a plastic extrusion device designed to anchor the fibers to the base film by means of a second softer film or lower melting film enveloping the fibers. The fibers 19 are supplied to the process from a creel 18; they are then brought to the desired angular pattern by means designed therefor 20, which may be, for example, an oscillator or a chain device, or a multiple belt device as known in the art. Having passed between the above mentioned rollers 16 and 17, the film 12 with adhesive and fibers carried thereon is then moved in a 45° angle to the direction of the axis of the mandrel 21 onto which the fiber carrying film is being spirally wound, the adhesive being on the outside. The mandrel is preferably covered with polytetrafluoroethylene to prevent adhesion with such adhesive as might accidentally leak or be pressed out on one side of the film. The mandrel is being supported by firm supporting means 22, such as heavy bearings, and/or by supporting rollers on the underside thereof 23. A counter weight 24 counterbalances the weight of the mandrel and the tension of the film it is carrying, so as to ease the load on the bearings. Feeding in this 45° pattern at a 45° angle on the mandrel, the resultant tubular structure will have the reinforcement in a hoop angle which is a 90° angle with the direction of the tubing and the other set of fibers parallel therewith. The edges of the film may be heat sealed or otherwise joined together with a joining device 25. Furthermore, a second ply of film 27, FIG. 3, can be fed onto the mandrel at a point removed from the center, preferably by 1½ film width, or to say the same thing in another manner, parallel with the film fed from the first film fiber aggregate making device and staggered with it. In this fashion, the second ply 13 will be applied to the first ply 12 so as to be adhered thereto by means of the adhesive. It may be further impressed into this by means of suitable means such as, for example, a pressure roller forming a nip with the mandrel (not shown). This also would be coated with polytetrafluoroethylene or otherwise rendered non-adherent to the adhesive. Additional plies of film can be similarly applied so that as many plies as desired are placed on the same mandrel. Finally, a plain sheet of the plastic 28 FIG. 10, can be superimposed and pressed onto the outermost ply in order to seal off the adhesive and form a smooth non-tacky surface which can be conveniently handled. In the event that the adhesive used is a hot melt adhesive or one which dries hard, it may not be necessary to apply this last mentioned film. However, generally speaking, application of a final film onto the outer surface is desirable as it provides opportunity for making this outer surface of the tube produced particularly hard, scuff resistant, dyeable, or to impart to it other properties which may be desired.

It is possible also to apply a set of fibers parallel with the axis of the tube to be formed by feeding these onto the aggregate at the mandrel. For example, longitudinal fibers can be fed into the point of closure of the ply as the tube is being wound from rolls attached to the mandrel or otherwise revolving at the same rate as the mandrel. These fiber-carrying rolls can be multiplied if multiply tubing is produced.

Figure 8:
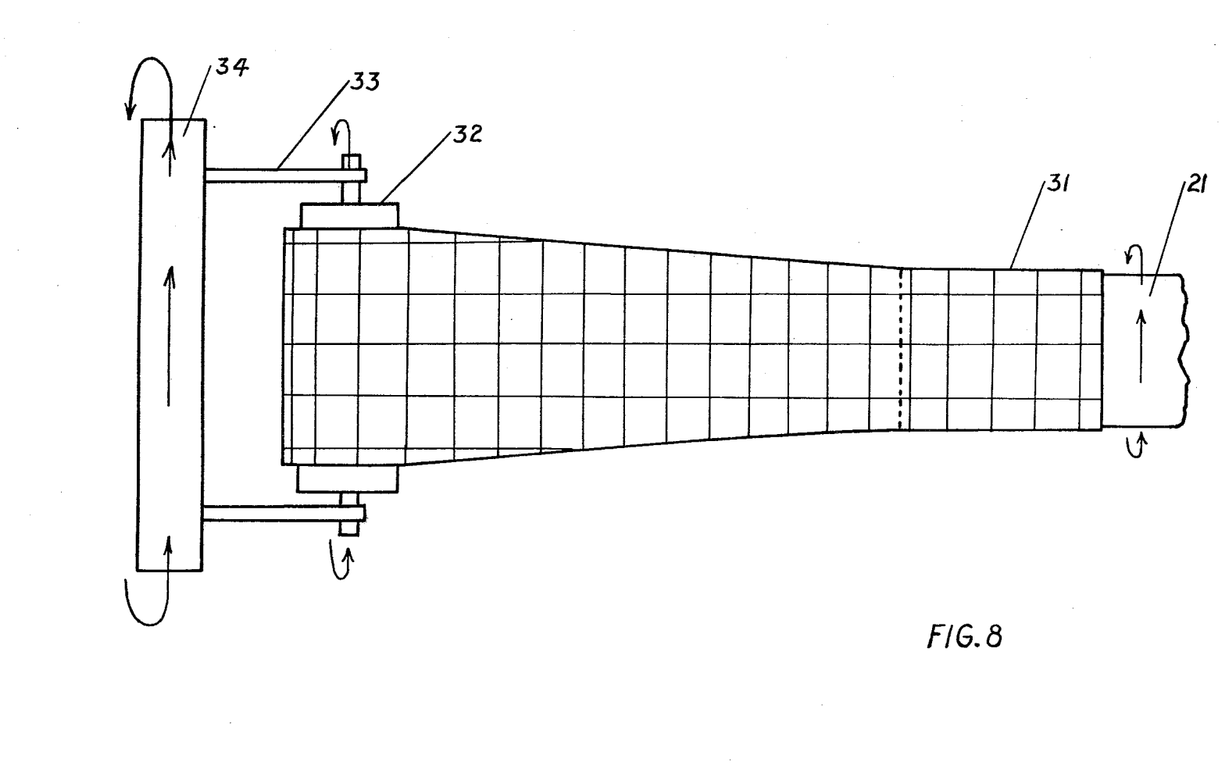

The tube 31 produced by the machine is collected on a take-off mechanism shown in FIG. 8. Since the tube 31 has a rotary motion upon leaving the mandrel 21, it is desirable that the take-off roller 32 have a corresponding rotary motion. It is therefore mounted by clamping means 33 onto a revolving support 34 which is driven by means (not shown) so as to rotate around its axis to receive the tubing 31 at the same speed at which this is being produced, while at the same time revolving in consonance with the mandrel 21 to match the rotary motion of the tubing.

While reference is made to fiber, it is also possible to use narrow strips of film which have been oriented in the longitudinal direction and thus have the reinforcing properties of fibers, and for the purposes of this invention, are the equivalents of fibers.

Figure 5:
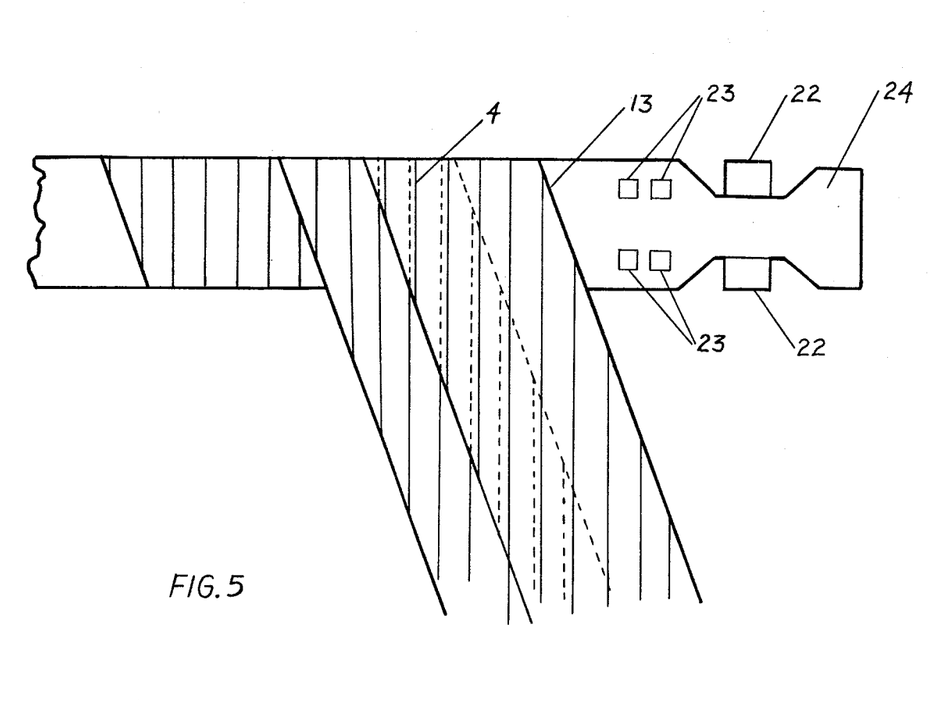

A minimum number of layers of reinforcement suitable for this invention is *one*, as shown in FIG. 5, in which case the angle between the longitudinal axis of the mandrel and the sheet wound thereon is selected so that the one set of parallel fibers will substantially form circles in planes perpendicular to the axis on the resultant tubular article.

The systems of non-woven parallel fibers applied for reinforcement will include fibers which considered mathematically as lines in the plane of the component sheet material will substantially meet the following equation:

$$Y = tg(90-a)X + b(n+1)$$

where $b$ is the distance between the parallel fibers in the system, $n$ the number of fibers between the point of intersection of the particular fiber with the Y axis, and origo, and Y and X are coordinates of any point of the line to the Y and X axes respectively.

When producing these tubular articles starting on the basis of a diamond pattern, the resultant angles between reinforcing fibers on the tube produced may be such that the longest line drawn parallel with the longitudinal axis through the crossover point of any two fibers belonging to the two different systems of parallel fibers will bisect the angle between these.

Any third system of fibers parallel with the longitudinal axis of the resultant tube may then advantageously but not necessarily be supplied from rollers at the mandrel, particularly where a bond of the fibers is produced by melting a hot melt composition of a lower polymer of the plastic employed in making the product or otherwise adhesively compatible with this, or adherable to it. The fibers then may become included in the said layer so that they will be positioned within or in the adhesive binding component of the ultimate product.

For withstanding irregular stresses or continued stresses in one direction or for maximum tear resistance of thin tubular laminates, it is particularly advantageous to have the fibers slideable within the laminate. To this end, it is preferred that the adhesive employed be tacky, though not necessarily at room temperature.

The mandrel may be operated in conjunction with an auxiliary temperature raising means for sealing purposes. This then takes the place of 25, FIG. 4. For example, hot air may be supplied in order to promote adhesion, or pressure sensitive adhesive may be used.

For the invention it is not necessary to apply adhesive but the films themselves can be heat sealed directly. However, I prefer to employ adhesive bonding because for maximum strength an orientation should be present in the sheets, and heat sealing throughout the sheets is too likely to lead to deterioration of a part or all of the tensile strength attained in high strength films by orientation. Heat sealing may be preferred, however, in some cases when a lower melting coating is being used for the heat seal, so that body of base film which is oriented will not be weakened by this procedure. Heat may also be applied in conjunction with an adhesive at 25, FIG. 4, in the form of a superheated hot melt adhesive. A principal aspect of this invention resides in methods of using film winding instead of filament winding and of obtaining reinforcing effects conveniently and rapidly by film winding films in which fibers or film or other reinforcements have been prearranged in optimized angles, particularly in an angle such that, as wound, one family of parallel fibers will in the finished product form circles in planes perpendicular to the longitudinal axis of the pipe produced.

EXAMPLE 7

In still another embodiment of the invention, I laminate the fibers between two sheets of any flexible material available in sheet form, and then spiral wind the laminate so formed, applying adhesive to the outer, non-fiber carrying sides of the laminate alone or in conjunction with additional reinforcing films or fibers, or heat-sealing the overlapping parts of the plies together, thus achieving a reinforced tubular structure of great strength and extreme tear resistance.

Figure 10:
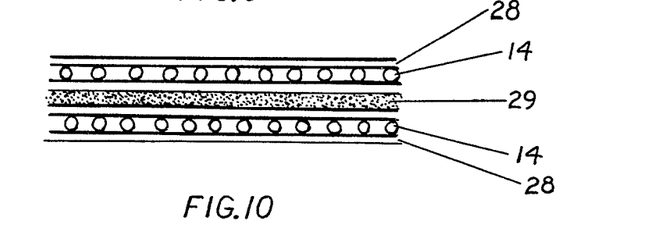

This structure was accomplished by using the procedure and device of Example 1, except that after the adhesive was applied to secure the fibers 4 and 6 to the film a second ply of the film laminate 14, FIG. 10, was superimposed over the fibers to produce a double laminate in which the fibers were held by an adhesive having less tear strength than the films employed, so that if a stress was applied, the fibers would slide between the films before these would give. To this end films were preferred which had at least 20% elongation before break.

Figure 9:
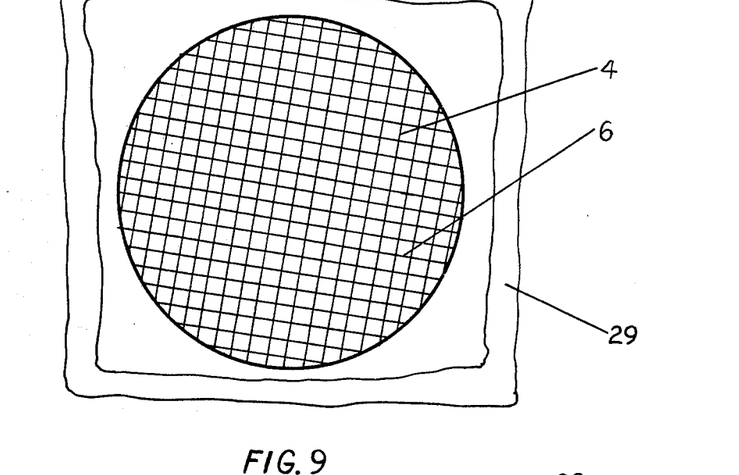
FIGURE 9 is a top view, FIGURE 10, a sectional detail view and FIGURE 11 a perspective view.
Figure 11:
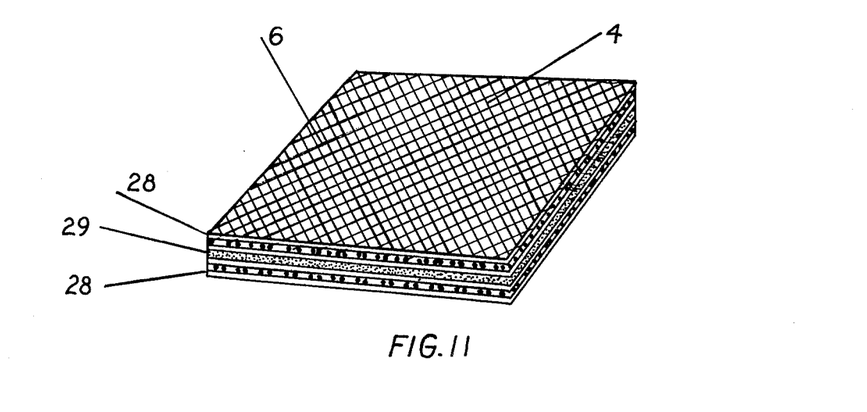

The laminate thus obtained was cut into strips and wound onto a mandrel as described in Example 1. To effect bonding of the laminate strips to form the desired tube, an adhesive was applied for example by brush or spray and its volatile constituents allowed to evaporate before the winding proceeded to the point where the outer film would preclude further evaporating. This step is shown in FIG. 9. The resultant product in FIGS. 10 and 11 in which the adhesive by which the primary laminated films are designated as 14, and the adhesive holding the primary laminate strips together is designated as 29.

While reference has been made to the application of these geometrically pre-arranged reinforcing fibers to ordinary plastic films, it is also possible to apply them to films into or onto which have been combined randomly fibers so that a measure of anisotropic reinforcement already exists. In this case, such general reinforcement will contribute to anisotropic strength of the resultant tubular product, while the oriented directionally prearranged fibers giving the maximum strength in optimal directions will give it the decisive superiority required for use in pipe inducting applications.

Such a fiber reinforced system including randomized fibers is illustrated in FIGURE 7 in which 15 indicates randomly disposed fibers supplementing the main fiber system 4 and 6. From the formulas shown and the application data available, it is evident that the reinforcing fibers, except those applied at the mandrel, would not have an individual length greater than 9.3 times the width of the film being spirally wound to form the desired tubular article, and in the preferred case, not substantially longer than the width times 2.

For the purposes of this invention, I mean by a fiber, any elongated object with its shortest dimension narrower than ¼" and which has its long dimension at least ten times the diameter of the average cross section.

Since this invention is essentially mechanical, it is not limited to particular materials. For the sheet material, any flexible product which can be mass produced in the flat is suitable, with a preference for those which can be oriented by drawing, blowing, etc., such as sheets of polyvinyl chloride, polyesters, polyurethanes, polyethylene, polypropylene, polyamids and the like. However, products which are not so oriented, such as paper sheet, cardboard, thin metal plates or sheets and elastomer sheets are usable as well as the sheets of any plastics which have adequate mechanical properties, combinations and laminations thereof including such plastics or other potentially sheet formable materials which may be discovered at any future time. The same essentially is true of the fibrous reinforcing materials which will include all potentially fiber forming plastics, whether thermoplastic or thermoset, although the thermoplastic is generally preferred, as well as fibers of glass, aluminum oxide, steel, boron and beryllium.

Having thus disclosed my invention, I claim:

1. A tubular article of manufacture comprising spiral wound reinforced film laminate, said laminate being reinforced with continuous fibers in a non-woven diamond pattern, the angle of winding of said laminate being such that one side of the diamonds in the pattern is in a plane perpendicular to the longitudinal axis of said article.

2. The article of claim 1, in which one set of parallel fibers in the said spiral wound laminate forms closed circles positioned in planes perpendicular to the longitudinal axis of said article.

3. As in claim 1, the said parallel fibers being positioned in an adhesive binding component of the said laminate.

4. As in claim 1, the said fibers being contained within a plastic film.

5. As in claim 1, the said article comprising plies joined by heat sealing means.

References Cited

UNITED STATES PATENTS

| | | | |
|---|---|---|---|
| 638,247 | 12/1899 | Hyatt | 138—129 |
| 2,647,300 | 8/1953 | Thomas et al. | 138—129 |
| 2,748,805 | 6/1956 | Winstead | 138—144 |
| 2,888,042 | 5/1959 | St. John et al. | 138—132 |
| 2,234,353 | 3/1941 | Quinlan | 138—129 |
| 2,824,033 | 2/1958 | Donaldson | 156—174 |
| 2,941,911 | 6/1960 | Kumnick et al. | 138—129 X |
| 3,020,615 | 2/1962 | Peters | 138—129 |

PATRICK D. LAWSON, Primary Examiner